United States Patent [19]

Ponce et al.

[11] 4,175,679
[45] Nov. 27, 1979

[54] TIMER-CONTROLLED AUTOMATIC ANIMAL FEED DISPENSER

[75] Inventors: Phillip Ponce, Valinda; John T. Kamon, Altadena, both of Calif.

[73] Assignee: Carolyn M. Smith, Los Angeles, Calif.; a part interest

[21] Appl. No.: 929,330

[22] Filed: Jul. 31, 1978

[51] Int. Cl.² ............................................. G01F 11/10
[52] U.S. Cl. .................................... 222/70; 222/307; 222/361
[58] Field of Search .............. 222/361, 307, 305, 308, 222/70; 221/15, 264; 119/51.11

[56] References Cited

U.S. PATENT DOCUMENTS

| | | | |
|---|---|---|---|
| 1,273,720 | 7/1918 | Bachand | 222/307 |
| 2,116,105 | 5/1938 | Eaton | 222/361 X |
| 2,237,189 | 4/1941 | McCormack | 222/361 X |
| 2,587,338 | 2/1952 | Lee et al. | 222/361 |
| 2,772,659 | 12/1956 | Tennis | 222/70 X |
| 3,717,125 | 2/1973 | Sanders | 119/51.11 |

Primary Examiner—Allen N. Knowles
Attorney, Agent, or Firm—Boniard I. Brown

[57] ABSTRACT

A timer-controlled animal feed dispensing device is provided with a rotary cam having trip pins to periodically displace a rocker arm to reciprocate in conjunction with a bias spring, a shuttle assembly. At one end position of the shuttle assembly, a metering chamber defined in the shuttle assembly receives feed material through an opening in the base of a container. The metered feed portion is delivered through another opening below the shuttle assembly, upon its movement to its opposite end position. An agitator for agitating and stirring the feed material in the container are affixed to the shuttle assembly. Spaced primary and secondary engagement surfaces on the rocker arm interact with the trip pins to deliver mechanical shock loading into the feed mass during the filling of the metering chamber.

12 Claims, 11 Drawing Figures

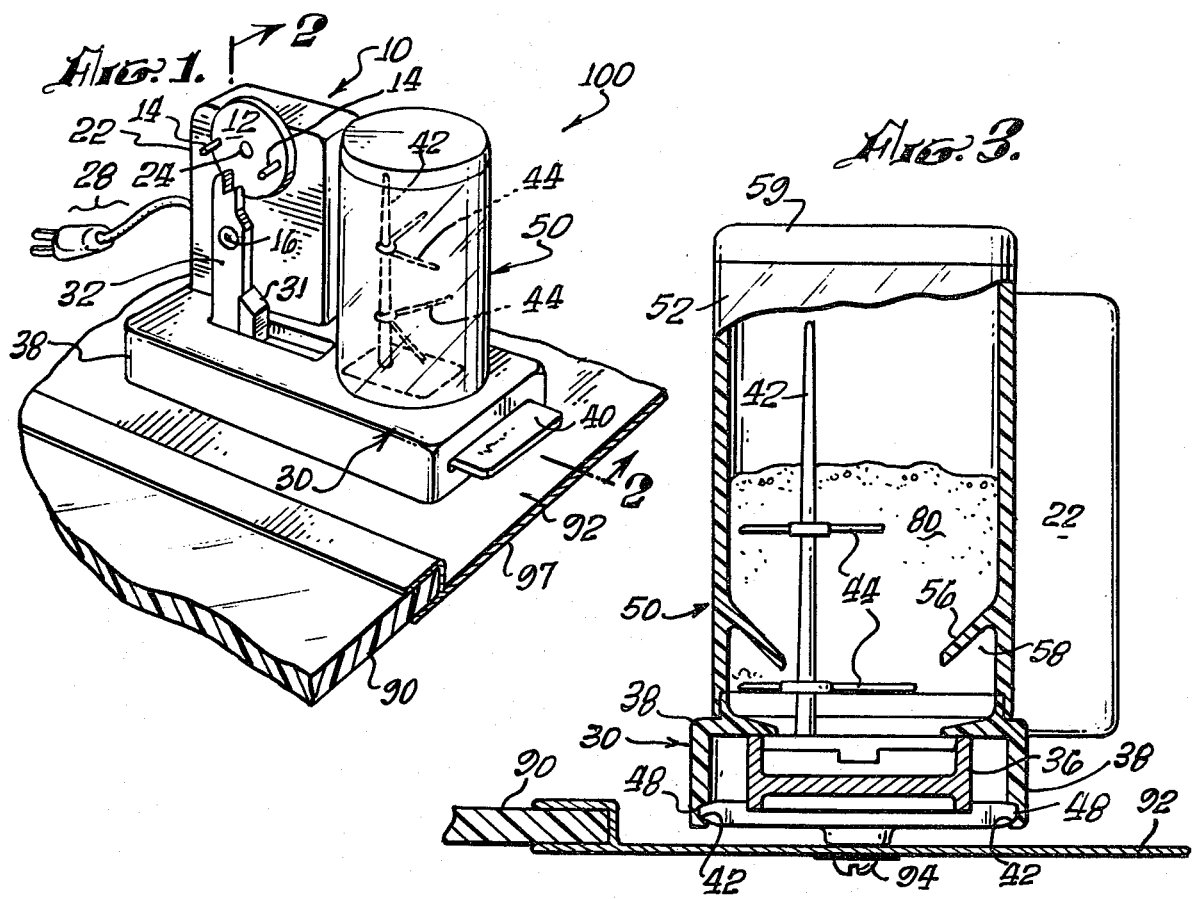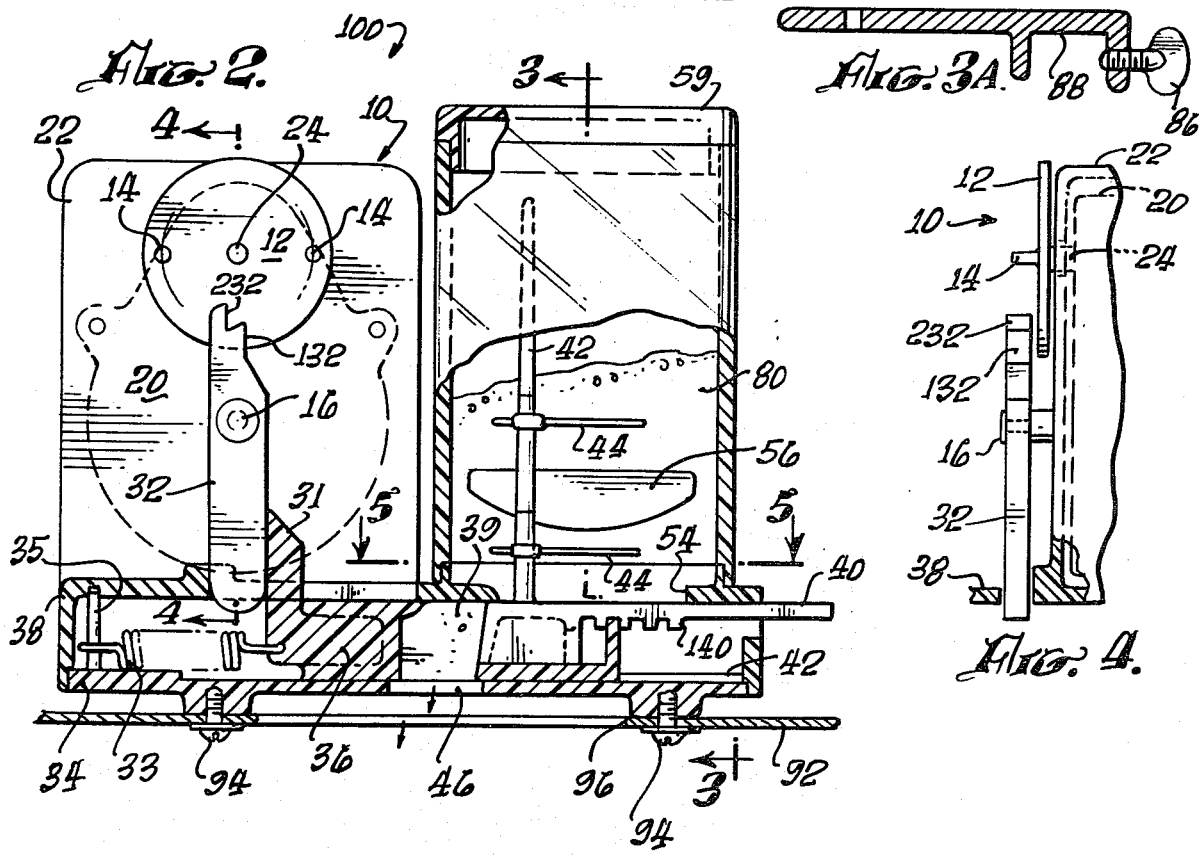

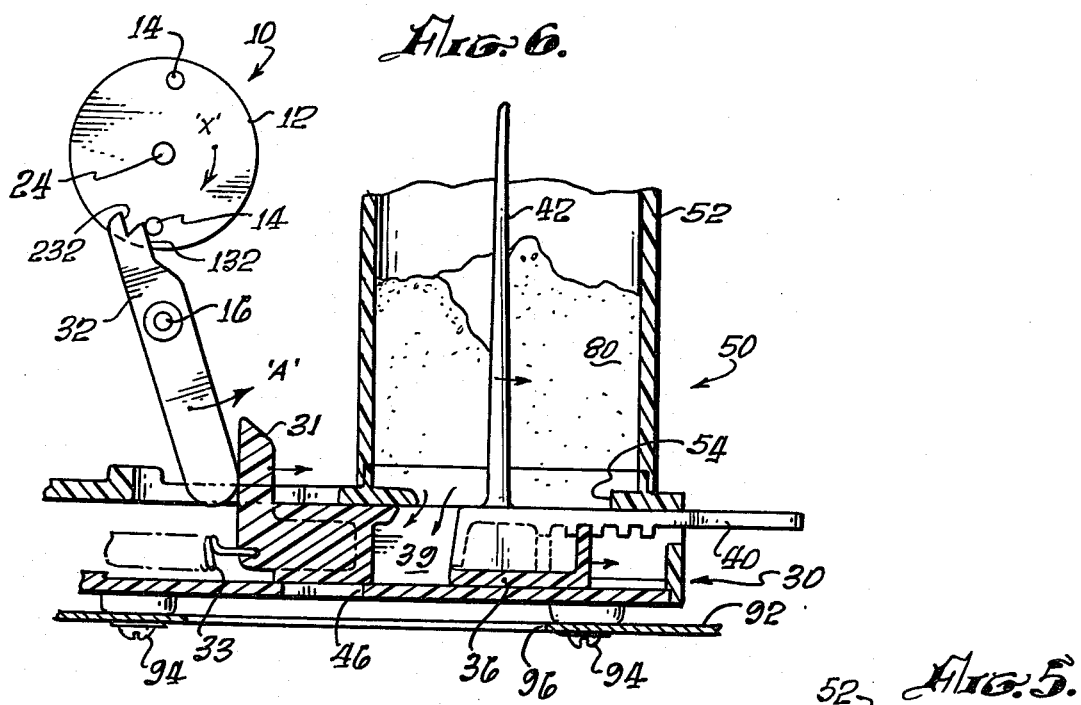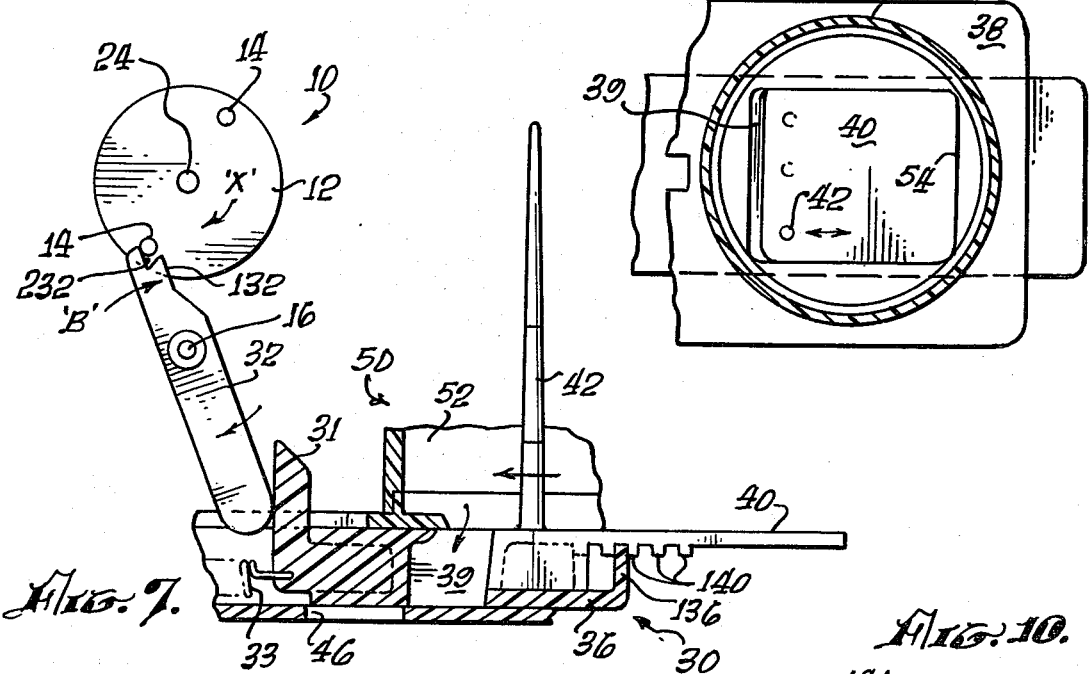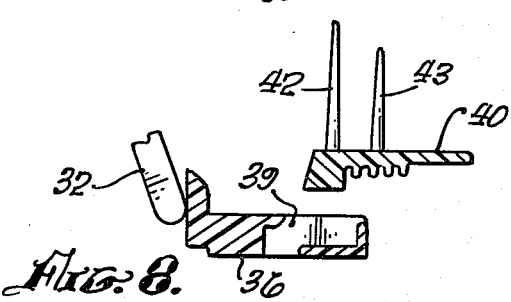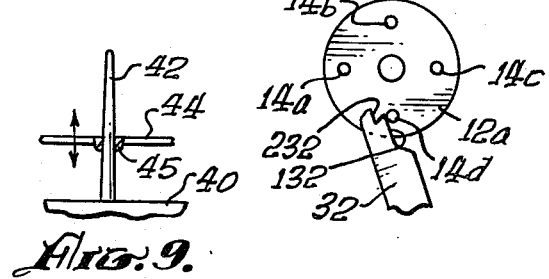

TIMER-CONTROLLED AUTOMATIC ANIMAL FEED DISPENSER

BACKGROUND OF THE INVENTION

The invention relates generally to timed feeding apparatus; more particularly, it relates to apparatus for dispensing metered amounts of powdered, granular or pelleted animal feed at predetermined intervals into feeding dishes, fishtanks and the like.

The need of domesticated or captive animals to be fed on a regular schedule is well known, and the need has generally through the attention of an owner or keeper who dispenses the required amount of feed into a dish or tank where the animals may have access to it. It is known in the prior art to provide clock-operated devices capable of dispensing predetermined amounts of feed at regular intervals, these being particularly adapted to serving small domesticated or captive species—birds, fish, cats, dogs, etc.—during periods when their normal attendants are absent on vacation, for example, and cannot attend to their needs.

Such prior art devices are generally bulky and unsuited to dispensing small, accurately metered quantities, such as may be required from the nourishment of small birds or of fish in an aquarium. Such prior art devices are generally expensive and require maintenance and care beyond the capacity of most pet owners and non-professional animal keepers.

It is therefore a primary object of the improved feeding device of the invention to provide self-contained feeding means for dispensing relatively small portions of powdered, granular or pelleted feed at predetermined intervals.

An object of the invention is to provide means, in an animal feeder with the aforementioned characteristics, for readily changing the volume of feed dispensed and for altering the interval between feed delivery cycles.

It is another object of the invention to provide improved feed dispensing apparatus capable of economic manufacture and requiring minimal skill for operating and maintenance.

SUMMARY OF THE INVENTION

The foregoing objects, as well as other objects and advantages which will become apparent from the detailed description of the preferred embodiment of the invention, are attained by a feeding device powered by a conventional clockwork motor, preferably electrically operated, adapted to reciprocate a feed metering and dispensing shuttle between first and second positions. The first limit position of the shuttle is maintained by means of a resilient bias element, suitably a spring, and the second position is attained by the action of a clock-driven cam and charges the metering shuttle with a predetermined amount of feed through a port in the base of a container adapted to store such feed. Upon cam deactivation, the resilient bias element returns the shuttle to its first position, dumping the feed material through a suitable opening into the feeding dish or fishtank.

The metering and dispensing shuttle is constructed of two separated components which may be engaged in a number of distinct relative positions in such a manner that the metering chamber defined by these members is varied in volume by such adjustment.

The cam has activating pins and is rotated by a clockwork shaft, the number and spacing of the pins determining the frequency of activation of the shuttle, by a lever pivoted intermediate the cam and the shuttle track.

The feed container has a removable or hinged lid, through which the feed material is charged, and has internal guidevanes designed to prevent the formation of a compacted jam of feed material. The stirring of the feed material by agitating members on the shuttle and projecting into the container through its bottom part, serves as additional means for prevention of feed compaction.

The feed material, which may be powder, flakes, granulated, or pellets, is dispensed through by gravity—both in transfer from the container to the shuttle and in discharge from the shuttle through a suitable opening in the base of the feeding device—the energy requirements are minimal, permitting the utilization of mechanical clock mechanisms and electrical timing motors operated by batteries, where such drive means are preferred over synchonous motors operated from household supply circuits.

The feeding device of the invention may be fabricated of sheet metal and plastic components, and using conventional, economical manufacturing techniques.

BRIEF DESCRIPTION OF THE DRAWINGS

The preferred embodiment of the improved animal feed dispensing device of the invention is described below with reference to the accompanying drawings, in which:

FIG. 1 is a perspective view of the feeding device of the invention installed on the cover plate of an aquarium;

FIG. 2 is an elevational sectional view, taken at line 2—2 of FIG. 1;

FIG. 3 is a lateral sectional view, taken at line 3—3 in FIG. 2, through the feed container of the feeding device;

FIG. 3A is a sectional view of an alternate mounting bracket, for use in mounting the feeding device on a vertical wall or support;

FIG. 4 is a fragmentary sectional view, taken at line 4—4 in FIG. 2;

FIG. 5 is a sectional view taken at line 5—5 in FIG. 2;

FIG. 6 is a transverse sectional view, with the clock mechanism omitted for clarity, showing the shuttle of the invention in its filling or metering position;

FIG. 7 is a view similar to that of FIG. 6, illustrating a jarring action imparted to the shuttle by a cam follower;

FIG. 8 is a fragmentary sectional view of an alternate form of the shuttle assembly with a plurality of agitator posts;

FIG. 9 is a fragmentary view of an agitator arm having transverse stirrer vaines; and FIG. 10 is a fragmentary view of an alternate form of cam for increased frequency of feed dispensing operation.

DESCRIPTION OF THE PREFERRED EMBODIMENT

FIGS. 1 and 2 show an animal feed dispenser device 100, mounted on a panel 92 inset in cover plate 90 of an aquarium. The feeder device 100 is designed to deposit predetermined amounts of fish food into the aquarium at predetermined intervals, and comprises three major subassemblies, a timer assembly 10, a metering and dispensing assembly 30, and a feed container assembly 50.

The timer assembly 10 comprises a motor 20 in a housing 22, with an integral speed-reduction transmission having an output shaft 24 extending through housing 22 to mount a rotary cam 12 having projecting trip pins 14. The timer assembly is actuated by the motor 20 which is powered from an electrical utility outlet via a connector 28. In the preferred embodiment of the invention, motor 20 is synchronous and the output shaft 24 rotates once in 24 hours. In other embodiments of the invention, different rotational speeds may be used, and the motive power may be derived from spring mechanisms or from battery-powered motors.

The timer mechanism 10 is mounted atop housing 38 which encloses the components of the metering and dispensing assembly 30. Housing 38 also serves to mount feed container 52 of the feed container assembly 50. A shuttle member 36 reciprocates in a groove 42 in the upper surface of a baseplate 34 onto which the cover 38 is secured by resilient snap connector means.

The metering and feed assembly is reciprocated by engagement of cam follower 31 of shuttle 36 by rocker arm 32 when the rocker arm is pivoted about stubshaft 16 by a trip pin 14. A slide 40 is interlocked and movable with the shuttle member. During the travel of the shuttle assembly a portion of port 54 in container 52 is exposed and feed material from the container is deposited in a metering chamber defined by the shuttle member and slide 40. This metered feed portion escapes from the feed device upon the release of the rocker arm 32 by trip pin 14, and the return of the shuttle assembly to its rest position under the action of helical spring 33 which is anchored to a pin 35 in baseplate 34. Feed material is delivered from the device 100 via an opening 46 in the baseplate 34 and an opening 96 in the panel 92 to which the baseplate is secured by screws 94.

A difficult problem in the operation of animal feed dispensing devices arises from the tendency of the organic feed material to contain fatty components having properties which tend to reinforce the tendency of finely divided materials to agglomerate and to develop high relative frictional forces among their particles. This jamming tendency of the feed material charged into the container 52 is combated by the provision of at least one agitator arm 42 affixed to the slide 40, so that the movement of the shuttle assembly causes the arm 42 to transverse the mass of feed material in the container. Additional stirring of the granular feed can be attained through the provision of stirring vanes 44 radiating from an agitator arm 42 (FIG. 8), and by the impact loading of the shuttle assembly during the metering phase of its operation, as more fully described below.

The free flow of the particles of an animal feed mass 80, charged into container 52 through removable lid 59, is further facilitated by the provision of sloped guides 56 which define a relatively narrow channel along which the agitator arm 42 traverses during the metering operation. The guides 56 are so formed that a downwardly open region 58 is formed under each of the guides. The volumes 58 tend to entrap air in pockets, and thus promote the formation of a free surface in the feed mass 80 just above the opening 54. The combination of these measures effectively prevents the caking or agglomeration of the feed material, regardless of its natural tendency to do so, and ensure that the desired amount of food is delivered on each working stroke of the mechanism.

The sectional view of FIG. 3 illustrates the extension of guides 56 into the internal volume of the substantially cylindrical feed container 52, and the positions of the agitator arm 42 and the stirring vanes 44. Also shown are the snap-fit connector features 48 extending along the edges of baseplate 34, each comprising a groove in the inner surface of cover 38 and a mating bevelled edge on the baseplate.

FIG. 3A is a sectional view of an alternate means for mounting the feed dispensing device 100 to a vertical support, such as the edge of an aquarium, comprising a bracket 88 and thumbscrew 86. This bracket is particularly adapted for fishtanks having no cover plate, and for cages with rigid sidewalls and wiremesh covers.

FIG. 4 shows, in sectional view, a portion of the timer assembly 10, including showing camplate 12, and a trip pin 14 and rocker arm 32 rotatably secured to housing 22 on stubshaft 16. Successive engagement faces 132, 232 are provided on the upper portion of the rocker arm, face 132 being engaged initially by trip pin 14, then being released when the deflection of the rocker arm moves it out of the rotational path of the trip pin, whereupon the rocker arm snaps back into a position where the secondary engagement surface 232, located at a greater radius from the shaft 16, comes to bear against the trip pin.

FIG. 5, taken at line 5—5 in FIG. 2, shows a position of the slide wherein its leading edge has just cleared the corresponding edge of the orifice 54, thereby exposing a metering chamber 39 defined in the shuttle assembly 30. With the feed container charged with feed, the material would begin to fill the metering chamber 39 in this position of the slide.

FIGS. 6 and 7 illustrate successive positions of the components during the working stroke of the shuttle assembly. In FIG. 6 the primary engagement surface 132 of rocker arm 32 has been engaged by a trip pin 14 by the rotary motion of camplate 12, in the sense of arrow 'X.' This engagement rotates rocker arm in the sense of arrow 'A' to impart a corresponding motion to the shuttle assembly via cam follower 31. This rightward movement exposes the metering chamber 39 to communication with the interior of feed container 52, via port 54, and results in the filling of the metering chamber with feed material from the container by gravity. To ensure the free flow of such feed material, the mass 80 in the container is disturbed by the passage therethrough of agitator post 42 and stirring vanes 44.

Further loosening of the feed mass into a fluid state may be desirable and is attained through impact loading or jarring action imparted to the shuttle assembly by the transfer of the camming action of the trip pin 14 from the primary engagement surface 132 to the secondary engagement surface 232, as shown in FIG. 7. During the transfer phase, rocker arm 32 is momentarily unsupported by the trip pin, so that the shuttle assembly is urged toward its rest position under the influence of bias spring 33. This motion effects rocker arm rotation in the sense of arrow 'B.' The reverse travel of the shuttle assembly is arrested by sudden contact between trip pin 14 and secondary engagement surface 232, with a resultant sudden deceleration and consequent jarring of the feed mass 80.

Referring to FIG. 7, the volume of metering chamber 39 is adjustable by relative displacement of the slide 40 relative to the shuttle 36, be selecting an alternate position for an upwardly bent tab portion 136 of the shuttle among a plurality of slots 140 in the distal surface of the slide plate. To make such an adjustment, the cover 38 with the attached timer and container assemblies, is disengaged at snap connection 48, and the two portions of the reciprocating assembly, the shuttle 36 and the slide 40, are temporarily separated and subsequently reassembled in the desired relationship. Replacement of the shuttle assembly in the track groove 42, repositioning of cover 38, and the re-engagement of the latter at the snap connection, completes the adjusting process.

The ability of the user to vary the amount of feed delivered in a working stroke of the feeder device 100 is of great benefit, allowing for the provisioning of a variable population in a fishtank, or of birds of different feed requirements in a birdcage, for example. The frequency of the feed delivery strokes of the device 100 is also adjustable, through the replacement of the camplate 12, with an alternate camplate 12a, for example. The alternate camplate 12a (FIG. 10) has four trip pins 14a, 14b, 14c, and 14d, each of which performs the same function in the same manner, as the two trip pins 14 of the camplate 12, thereby doubling the number of feed deliveries during one rotation of timer shaft 24. The number of trip pins provided on a given camplate, and their relative positioning about the camplate, allow substantial flexibility in the operation of the automatic feeder device 100.

FIG. 8 illustrates in an exploded sectional view, a modified form of slide 40a which differs from the slide 40 in having an additional agitator post 43, serving to further displace feed material during the movement of the shuttle assembly, so as to facilitate the transfer of the material into metering chamber 39.

FIG. 9 shows another modified form of slide 40 and agitator post 42 wherein a stirring vane 44 has a pair of arms oppositely extending from a hub 45 fitting about the shank of agitator post 42 which is an upwardly tapering shaft, the support elevation of vane 44 being defined by mutual interference between post 42 and the hub 45. The stirring vane 44 sweeps through feed mass 80 during the working stroke of the feeder device, so as to further ensure the fluidity of the feed material in container 52.

The feeder device of the invention has been described with reference to the illustrated preferred embodiment. Variations in the mechanical arrangement of the several components described are possible, and may suggest themselves to one skilled in the art upon exposure to the teachings herein. Such changes, for example, in the manner of engagement of the shuttle assembly, in the nature of and location of the timer mechanism, in the shape and size of the container, and in the manner of affixing the feeder device to a structure, are deemed to be encompassed by the invention, delimited solely by the appended claims.

The inventors claim:

1. A timer-controlled automatic animal feed dispenser, comprising:
   powered timer means including a rotary cam with at least one pin,
   a rocker arm pivotally mounted and adapted to engage said timing means,
   shuttle means reciprocable between first and second positions and having a metering chamber and a cam follower for engagement by said rocker arm,
   spring means biasing said shuttle means toward the first position,
   a container for animal feed generally above the shuttle means,
   a transfer port in the base of said container communicating with the metering chamber when the shuttle means is in said second position, and
   means defining a discharge opening communicating with said metering chamber when the shuttle means is in said first position.

2. A feed dispenser according to claim 1, and further including housing means having an upper wall defining the transfer port and a lower wall defining the discharge opening, and wherein said shuttle means is slidably mounted relative to the upper and lower walls.

3. A feed dispenser according to claim 2, wherein said powered timing means and said container are affixed to said upper housing wall, and wherein said cam follower reciprocates in a slot in said upper wall.

4. A feed dispenser according to claim 3, and further comprising agitating means secured to the shuttle means and extending into said container through said transfer port.

5. A feed dispenser according to claim 4, wherein said agitating means include at least one upright post.

6. A feed dispenser according to claim 5, wherein said agitating means additionally comprise at least one stirrer vane on said post.

7. A feed dispenser according to claim 2 or claim 5, wherein said powered timing means include an electric motor drive.

8. A feed dispenser according to claim 2 or claim 5, wherein said rocker arm is provided with primary and secondary engagement surfaces adapted to bear successively against said pin.

9. A feed dispenser according to claim 5, wherein said container is provided with at least one internal downwardly sloping guide vane.

10. A feed dispenser according to claim 9, wherein a pair of guide vanes project from opposing portions of the internal surface of the container, with their inward edges spaced from one another and parallel to the reciprocating path of said agitating means.

11. A feed dispenser according to claim 2 or claim 10, wherein said shuttle means comprise separable shuttle and slide members the relative positions of which along the reciprocal traverse axis is variable by adjustment means to alter the internal volume of said metering chamber.

12. A feed dispenser according to claim 11, wherein said slide member is carried by the shuttle member, said agitating means being secured to an upper surface of the slide member, and wherein said adjustment means include a plurality of slots transverse to the reciprocating path of the shuttle means, and an upwardly projecting tab of said shuttle member engabable in any one of said slots.

* * * * *